United States Patent
Kleve et al.

(10) Patent No.: US 10,427,486 B2
(45) Date of Patent: Oct. 1, 2019

(54) SYSTEM FOR DETERMINING CLEARANCE OF APPROACHING OVERHEAD STRUCTURE

(71) Applicant: Ford Global Technologies, LLC, Dearborn, MI (US)

(72) Inventors: Robert Bruce Kleve, Dearborn, MI (US); Anthony Gerald King, Ann Arbor, MI (US); Brian Wolski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/358,657

(22) Filed: Nov. 22, 2016

(65) Prior Publication Data

US 2017/0072764 A1 Mar. 16, 2017

Related U.S. Application Data

(62) Division of application No. 14/067,316, filed on Oct. 30, 2013, now Pat. No. 9,546,876.

(51) Int. Cl.

| | |
|---|---|
| *G01C 21/34* | (2006.01) |
| *B60G 17/0165* | (2006.01) |
| *G08G 1/16* | (2006.01) |
| *G01C 21/32* | (2006.01) |
| *G01C 21/36* | (2006.01) |

(Continued)

(52) U.S. Cl.
CPC ......... *B60G 17/0165* (2013.01); *B60Q 5/005* (2013.01); *B60R 1/00* (2013.01); *G01C 21/32* (2013.01); *G01C 21/34* (2013.01); *G01C 21/3697* (2013.01); *G08G 1/165* (2013.01); *B60G 2400/252* (2013.01); *B60G 2400/823* (2013.01); *B60G 2500/30* (2013.01); *B60G 2800/914* (2013.01); *B60R 2300/8093* (2013.01)

(58) Field of Classification Search
CPC .... G01C 21/34; G01C 21/3697; G08G 1/165; B60R 2300/8093
USPC .......................................................... 701/37
See application file for complete search history.

(56) References Cited

U.S. PATENT DOCUMENTS

| | | | |
|---|---|---|---|
| 4,916,429 A | 4/1990 | Hicks et al. | |
| 4,994,971 A | 2/1991 | Poelstra | |

(Continued)

FOREIGN PATENT DOCUMENTS

| | | |
|---|---|---|
| DE | 2932118 A1 | 2/1981 |
| DE | 10351915 A1 | 6/2005 |

(Continued)

OTHER PUBLICATIONS

English Translation: Rychlak, DE 102009028644 A1, Feb. 24, 2011, German Patent Office Publication (Year: 2011).*

(Continued)

*Primary Examiner* — Nadeem Odeh
(74) *Attorney, Agent, or Firm* — Frank Lollo; Brooks Kushman, P.C.

(57) ABSTRACT

A vehicle system may include a controller configured to receive a height selection indicating a vehicle height from a plurality of vehicle height options, detect, via a first sensor, a low clearance structure and determine a clearance height, compare the vehicle height with the clearance height; and generate an alert in response to the vehicle height being greater than the clearance height.

13 Claims, 3 Drawing Sheets

(51) Int. Cl.
*B60Q 5/00* (2006.01)
*B60R 1/00* (2006.01)

(56) References Cited

U.S. PATENT DOCUMENTS

| | | |
|---|---|---|
| 5,389,912 A | 2/1995 | Arvin |
| 7,449,996 B2 | 11/2008 | Hill |
| 7,688,187 B2 | 3/2010 | Caird et al. |
| 7,761,227 B2 | 7/2010 | Kropp |
| 8,354,920 B2 | 1/2013 | Kole |
| 2004/0201495 A1* | 10/2004 | Lim .............. G08G 1/096716 340/905 |
| 2006/0015249 A1 | 1/2006 | Gleseke |
| 2007/0225900 A1* | 9/2007 | Kropp .............. G01C 21/3461 701/418 |
| 2009/0315693 A1 | 12/2009 | Nugent |
| 2010/0057353 A1 | 3/2010 | Friedman |
| 2011/0181407 A1* | 7/2011 | Kole .................. G01C 5/00 340/435 |
| 2013/0093583 A1 | 4/2013 | Shapiro |
| 2013/0103305 A1 | 4/2013 | Becker et al. |
| 2014/0303886 A1 | 10/2014 | Roemersperger et al. |
| 2016/0104379 A1* | 4/2016 | Reinards ............ A01D 75/185 340/435 |

FOREIGN PATENT DOCUMENTS

| | | |
|---|---|---|
| DE | 102004003294 A1 | 8/2005 |
| DE | 102006028625 A1 | 10/2007 |
| DE | 109009028644 A1 | 2/2011 |
| EP | 1475765 A2 | 11/2004 |
| JP | 2002310697 A | 10/2002 |
| JP | 2011060113 A | 3/2011 |
| WO | 2007108354 A1 | 9/2007 |

OTHER PUBLICATIONS

English Translation: Morikawa, WO 2007108354 A1, Sep. 2007, WIPO Patent Publication (Year: 2007).*
Combined Search and Examination Report for corresponding Application GB1419195.1, dated Apr. 30, 2015.
Search and Exam Report, corresponding European Application No. GB1601526.5, dated Feb. 25, 2016, 8 pages.
English Machine Translation of: Bald, DE102004003294A1, Aug. 2005, German Patent Publication.
English Machine Translation of: Stopp, DE102006028625A1, Jan. 2014, German Patent Publication.
English Machine Translation of: Morikawa, WO2007108354A1, Sep. 2007, WIPO Patent Publication.
English Machine Translation of: Wilhelm, DE10351915A1, Jun. 2005, German Patent Publication.
English Machine Translation of: Rychlak, DE102009028644A1, Feb. 2011, German Patent Publication.
Garmin, dezi 760 Owner's Manual, Nov. 2012, Garmin Ltd.

* cited by examiner

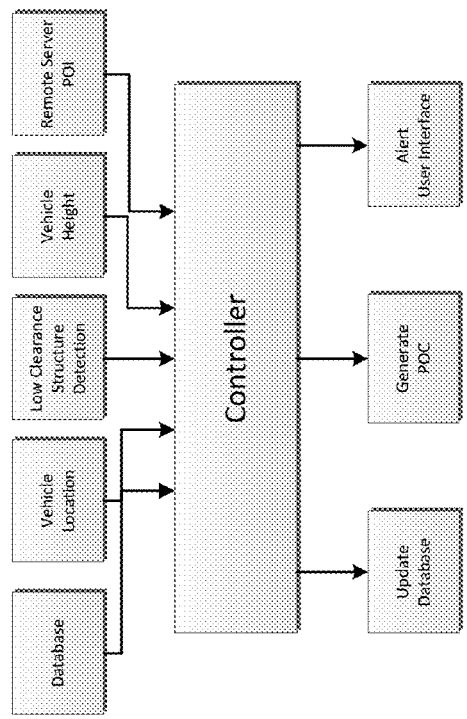
Fig. 2
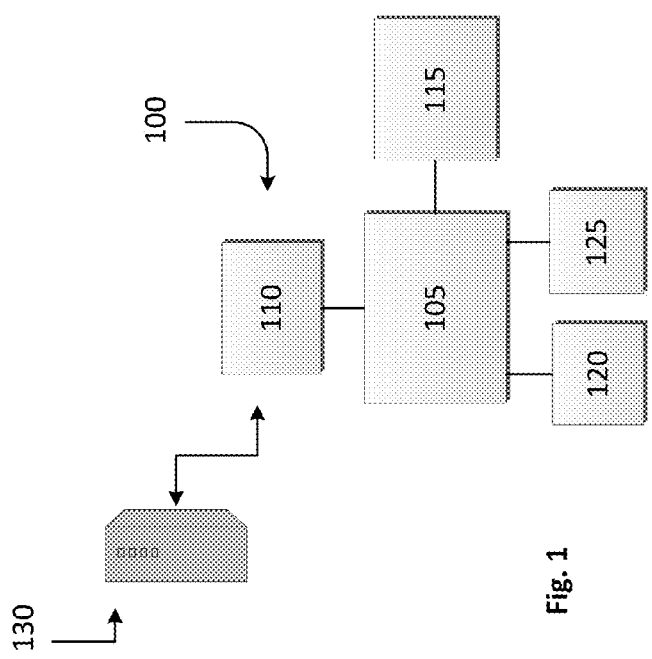
Fig. 3
Fig. 1

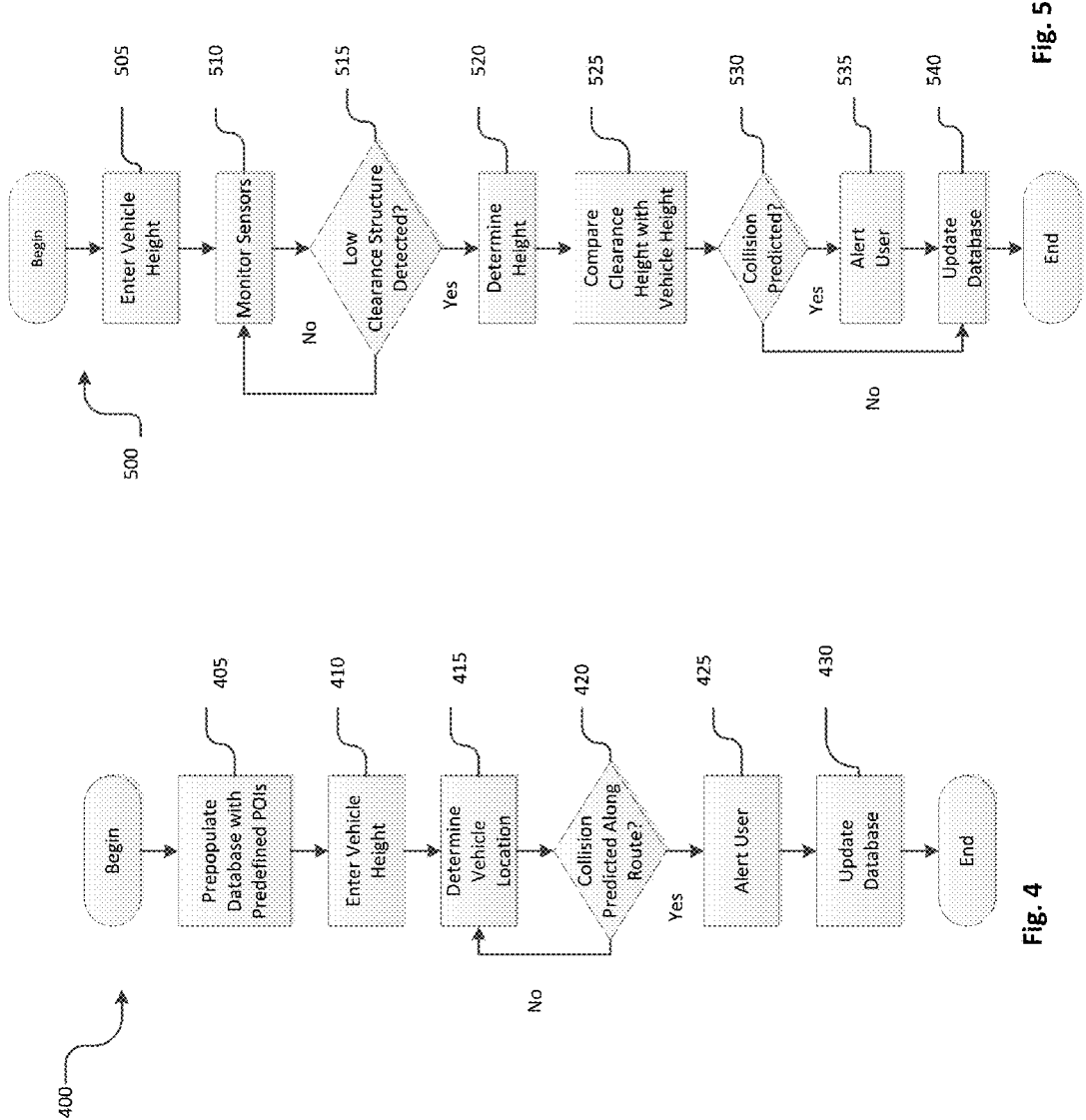

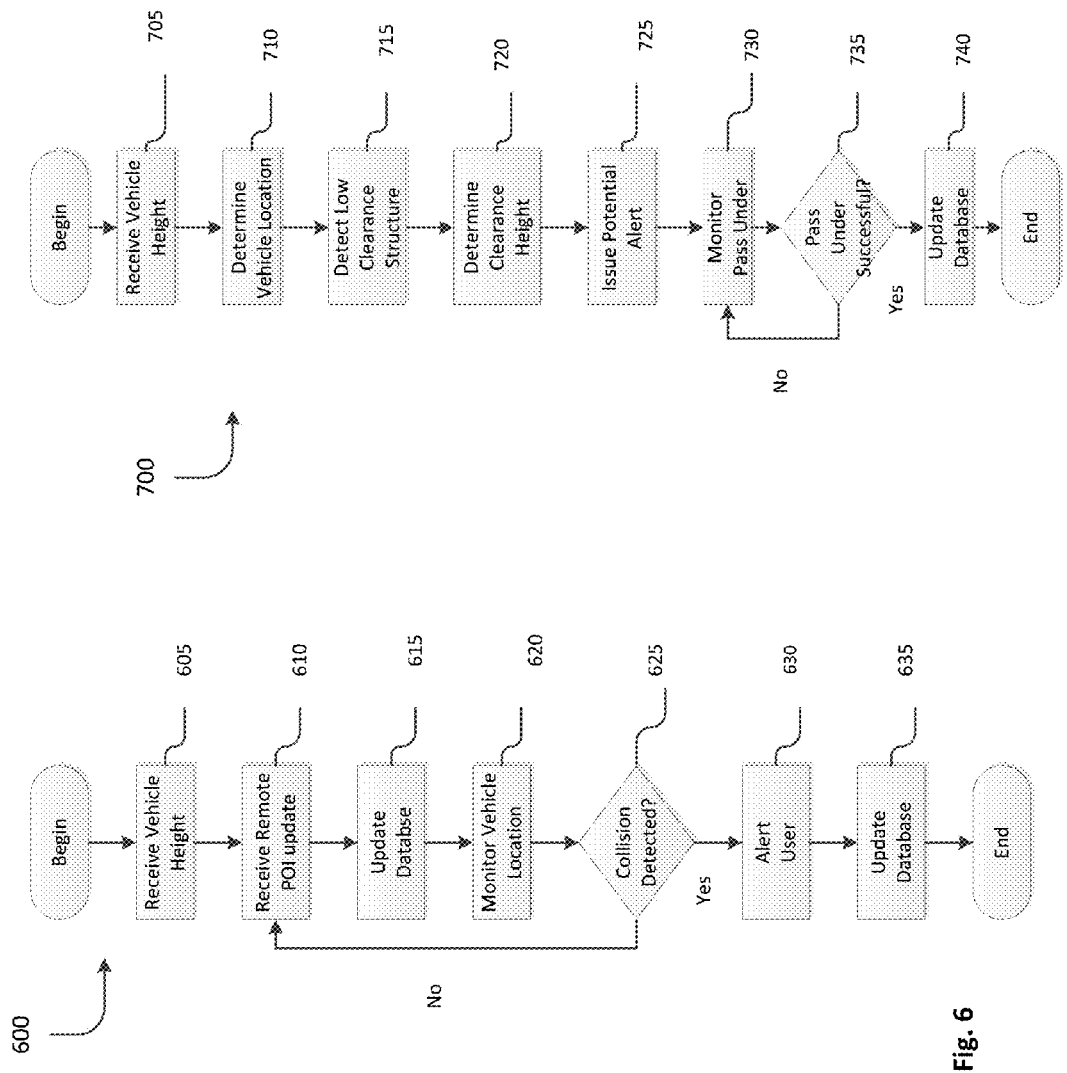

SYSTEM FOR DETERMINING CLEARANCE OF APPROACHING OVERHEAD STRUCTURE

CROSS-REFERENCE TO RELATED APPLICATIONS

This application is a divisional of U.S. application Ser. No. 14/067,316 filed Oct. 30, 2013, U.S. Pat. No. 9,546,876, issued Jan. 17, 2017, the disclosure of which is hereby incorporated in its entirety by reference herein.

TECHNICAL FIELD

Vehicles are often equipped with racks, mounts, or trailers to allow the operator to transport cargo on the roof of the vehicle or tow cargo behind the vehicle. The cargo often extends the vertical height of the vehicle, increasing the risk for collision between the cargo and low clearance objects, such as overhangs or garage doors for example. Such collisions may result in loss of life and property damage to the drivers as well as an economic burden to governmental entities and business to inspect or repair damage from incidents.

There have been several proposed solutions to mitigate the risk of vehicle collisions with low clearance structures. For example, a reminder device has been proposed, such as a tag hanging from the vehicle's rear view mirror. However, such a reminder device only reminds the user that cargo is on the roof and not to forget, but does not make specific reference to any particular clearance height constraints.

Further, an electronic system involving vehicle proximity to a known low clearance location has been proposed. These systems include a global positioning system configured to compare relative proximity to location of a structure with a known low clearance and the vehicle. However, the warning is based on proximity to any low clearance, and not tailored to the current vehicle height. Additionally, such systems are not configured to monitor in real-time unknown or unrecorded low clearance structures and alert the user accordingly. Accordingly, there is a need for a system to detect an approaching overhead structure and alert the user of a potential collision in response to the entered vehicle height, predefined low clearance structures, and real-time detection of such structures.

SUMMARY

A vehicle system may include a controller configured to receive a height selection indicating a vehicle height from a plurality of vehicle height options, detect, via a first sensor, a low clearance structure and determine a clearance height, compare the vehicle height with the clearance height; and generate an alert in response to the vehicle height being greater than the clearance height.

A method for a vehicle system may include receiving a height selection indication a vehicle height from a plurality of vehicle height options, detecting, via a first sensor, a low clearance structure and determine a clearance height, comparing the vehicle height with the clearance height, and generating an alert in response to the vehicle height being greater than the clearance height.

A vehicle system may include a controller configured to access a database configured to maintain a plurality of structures associated with a clearance height, receive a height selection indicating a vehicle height from a plurality of vehicle height options, detect, via a first sensor, a new structure and determine a clearance height, compare the vehicle height with the clearance height, generate an alert in response to the vehicle height being greater than the clearance height, and update the database with a location of the new structure to generate a new point of interest.

BRIEF DESCRIPTION OF THE DRAWINGS

FIG. 1 illustrates an exemplary system for detecting and alerting of low clearance locations;

FIG. 2 illustrates exemplary inputs and outputs of components of the system of FIG. 1;

FIG. 3 illustrates an exemplary database table populated with Points of Interest maintained in the geographical information database;

FIG. 4 illustrates an exemplary flow chart for providing an alert in response to prepopulated points of interest;

FIG. 5 illustrates an exemplary flow chart for providing an alert in response to real-time detection of a low clearance location;

FIG. 6 illustrates an exemplary flow chart for receiving a remote communication indicating a low clearance structure and providing an alert of the same; and FIG. 7 illustrates an exemplary flow chart for automated self-learning database in response to detecting a low clearance structure.

DETAILED DESCRIPTION

FIG. 1 illustrates an exemplary system 100 for detecting and alerting of low clearance locations. The system 100 may take many different forms and may include multiple and/or alternate components. While an exemplary system is shown in the Figures, the exemplary components illustrated in the Figures are not intended to be limiting. Indeed, additional or alternative components and/or implementations may be used.

The system 100 may detect an approaching low clearance structure, store the location and clearance height of the structure along with other predefined low clearance structures, and alert the vehicle user of a potential collision in response to an entered vehicle height and real-time detection of low clearance structures. The low clearance structure or structure may include low overhangs, bridges, tunnels, overpasses, parking structure entrances/exits, tree branches, and overhanging intersection lights. The system 100 may populate a database with detected low clearance structures for future reference.

The system 100 may include a controller 105 for monitoring and controlling various systems and subsystems within the vehicle. The controller 105 may include any computing device configured to execute computer-readable instructions. For example, the controller 105 may include a processor (not shown) and a module (not shown). The processor may be integrated with, or separate from, the controller 105. Alternatively, the controller 105 may include various modules, each configured to communicate with the processor via a gateway module (not shown). Additionally or alternatively, the system 100 may include multiple controllers 105, each including a processor and module.

In general, computing systems and/or devices, such as the controller 105 and processor, may employ any number of computer operating systems, including, but not limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating system distributed by Apple, Inc. of Cupertino, Calif., the Blackberry OS distributed by Research in Motion of Waterloo, Canada, and the Android operating system developed by the Open Handset Alliance. It will be apparent to those skilled in the art from the disclosure that the precise hardware and software of the controller 105 and processor may be any combination sufficient to carry out the functions of the embodiments discussed herein.

The controller 105 may be configured to determine a vehicle height via user input through a user interface 110. The user interface 110 may include a single type display (e.g., a touch-screen), or multiple display types (e.g., audio and visual) configured for human-machine interaction. The user interface 110 may be configured to receive user inputs from the vehicle occupants. The user interface 110 may include, for example, control buttons and/or control buttons displayed on a touchscreen display (e.g., hard buttons and/or soft buttons) which enable the user to enter commands and information. Inputs provided to the user interface 110 may be passed to the controller 105 to control various aspects of the vehicle. For example, inputs provided to the user interface 110 may be used by the controller 105 to interact with a navigation system, control media playback, or the like. The user interface 110 may include a microphone that enables the user to enter commands or other information vocally. The user interface 110 may additionally be configured to output commands. For example, the controller 105 may communicate an alert to the user interface 110 of an approaching low clearance structure. Moreover, the user interface 110 may display (or broadcast over speakers) the vehicle height upon demand, or other feature status information (e.g., attached cargo, selected feature, etc.).

The user interface 110 may include an information and communications technology device, such as a telematics device, cellular phone, or other portable or personal digital devices. The user interface 110 may facilitate integration of certain setup and telecommunication functions within the system 100. For example, a navigation system may be included in the user interface. The navigation system may include a global positioning system (GPS), as well as a radio-frequency identification (RFID), or a cellular device or personal digital assistant (PDA) GPS that is transmitted via a cellphone or PDA by Bluetooth®, for example. Moreover, the user interface 110 may facilitate communication with off-board locations over a wireless communications network. For example, the user interface 110 may communicate with off-board locations via a wireless communication network such as a wide area network (WAN), a local area network (LAN), radio frequency (RF) transmissions, or cloud-based communication. Additionally or alternatively, the user interface 110 may communicate with a mobile device via Bluetooth® or other wireless communications protocols, which may be in communication with off-board locations.

The controller 105 may be configured to receive, via the user interface 110, a user input indicating vehicle height. The user interface 110 may include a touchscreen with predefined selectable options (or vehicle height options) on the user interface 110 display. The selectable options may include several standard cargo selections that, in conjunction with the base vehicle height, indicate the total height of the vehicle (e.g., base vehicle height plus cargo height). For example, the selectable options may include a bicycle, skis, canoe, kayaks, loose luggage, and ladder. If the vehicle height is roughly 60 inches (~152 cm), the selectable option for a mountain bike may indicate the total vehicle height as 122 inches, or ~310 cm (assuming the standard mountain bike size is 62 inches or ~157 cm). The user interface 110 may also include a setup application or software running on an external and/or portable electronic device, e.g., a computer or processor, including but not limited to a smart phone, tablet, or laptop. The setup application may communicate data back to the controller 105 via wireless communications network such as Bluetooth, wide area network (WAN), a local area network (LAN), radio frequency (RF) transmissions, or cloud-based communication. The application may include functionality to configure all the selectable setup options as defined with the touchscreen. Additionally, the application may allow a picture to be taken of the vehicle, and automatically determine height of the cargo based on its understanding of the standard vehicle height. The application may automatically execute an image recognition of the vehicle itself, via the portable electronic device, to confirm that the height of the vehicle the application assumes is the same as the picture.

Additionally, the controller 105 may be configured to add some extra height to the base height and cargo height for added safety and precaution (e.g., adding 8 cm to the total vehicle height). Additional selectable options may be input and stored, thus allowing the user to customize the selectable options. The selectable options may further include standard trailer heights, such as low (~6 ft/183 cm), medium (~10 ft/305 cm), and high (~13 ft/396 cm) trailer sizes. The user interface 110 may be configured to allow for customized user inputs and include a favorites section (e.g., My Cargo 1, My Cargo 2, etc.). For instance, the user may input a customized cargo entry of 3' 8" (114.3 cm) that adds to the base vehicle clearance height. Similarly, the user may customize or modify the predefined selectable options in response to personalized preferences. For example, the user may modify the predefined mountain bike height from 157 cm to 147 cm.

Additionally or alternatively, the controller 105 may be configured to output automatic prompts for vehicle height settings to the user interface 110 in response to detecting cargo or a trailer. For instance, the controller 105 may determine a medium sized trailer is detected via the standard trailer electrical connections. The controller 105 may then communicate the medium sized trailer selectable option to the user interface 110.

The controller 105 may be in communication with a geographical information database 115. The database 115 may include prepopulated or predefined points of interest (POIs) indicating low clearance structures, such as tunnels and overhangs. Each POI or low clearance structure may be associated with a location, clearance height, a particular roadway, and the direction of travel. The POIs may be preloaded into the database 115 at the time of manufacture (e.g., by the original equipment manufacturer (OEM)). The POIs may also be updated by a series of upgrades or updates that are distributed to the users via any state-of-the-art physical storage media, including but not limited to, compact discs (CDs), USB flash drives, SD cards, and/or digital versatile discs (DVDs). Additionally or alternatively, the POIs may be distributed to the database 115 via a wireless communications network.

The controller 105 may be configured to receive various inputs and generate and deliver various outputs in accordance with the inputs received or computer-executable instructions maintained in a database 115. The geographical information database 115 may be comprised of a flash memory, RAM, EPROM, EEPROM, hard disk drive, or any other memory type or combination thereof. The system 100 may include multiple databases, each configured to maintain assorted information. For example, a first database may maintain geographical information, whereas a second database may maintain the programed vehicle height selectable options. The database 115 may store POIs, roadways or navigation information, and saved selectable options in long-term memory (e.g., nonvolatile memory) or Keep Alive Memory (KAM). Likewise, the database 115 may maintain an alert message associated with approaching a POC. For example, the alert may appear on the user interface 110 or be broadcast over the vehicle's audio system.

Additionally or alternatively, the database 115 may include a remote database (not shown) to which a plurality of vehicles may connect through a wireless network, such as a cloud network. The remote database may serve as the cloud infrastructure to which the plurality of vehicles may transmit updates in response to detecting new POIs and/or corrected clearance heights.

The controller 105 may communicate with a plurality of sensors 120, 125. The sensors 120, 125 may include any sensor or sensor system available in the vehicle that may be used to determine a vehicle location and detect an approaching low clearance structure. Alternatively, the module may receive input from sensors 120, 125, which may in turn be communicated to the processor. The first sensor 120 may include any sensor or sensor system for detecting an approaching low clearance structure. For instance, the first sensor 120 may include an optical range finder operating through infrared (IR) triangulation, a radio detection and ranging (RADAR) sensor, an ultra-wideband (UWB) radio sensor, a laser range finding sensor, a wireless receiver that reads infrastructure broadcast data, a LIDAR or light radar sensor, and a video camera or active-pixel sensor (APS). The low clearance structure detection sensor 120 may further be configured to determine the height of the low clearance structure via any known method. The second sensor 125 may include any vehicle location sensor included in the vehicle. For example, second sensor 125 may include a global positioning system (GPS) or a position sensor. It will be apparent from the disclosure that first and second sensor 120, 125 are interchangeable, such that first sensor 120 may include low clearance structure detection sensors and second sensor 125 may include vehicle location sensors, and vice versa.

The controller 105 may be configured to detect the approaching low clearance structure in response to the first sensor 120. For instance, the controller 105 may communicate with the APS to detect an upcoming low overpass or tunnel. Additionally, the first sensor 120 may be configured to recognize traffic signs of upcoming low clearance structures. The controller 105 may be configured to communicate with the sensor 120 to update, modify, or supplement the geographical information database 115 in response to detecting a low clearance structure. The controller 105 may generate a new POI in response to the first sensor 120 input. For example, the sensor 120 may detect a low clearance structure not predefined by the database 115 and determine the low clearance structure height. The controller 105 may communicate with the second sensor 125 (e.g., GPS), to determine the low clearance structure location. The controller 105 may then input the clearance height and structure location into the database 115 to generate a new POI. As such, the controller 105 may self-populate the database 115 while in-route via the first and second sensor 120, 125 input. Additionally, the controller 105 may be configured to modify existing POIs. For instance, the controller 105 may correct information that may have been erroneously or improperly input. In the event a predefined POI is recorded with an incorrect clearance height or location, the controller 105 may modify the POI in response to the first and second sensors 120, 125 inputs.

The controller 105 may be configured to update the geographical information database 115 in response to a user input via the user interface 110. The user may mark or indicate frequently visited places as a low clearance structure, thereby creating a POI. Likewise, the user may input the current vehicle location as a POI, for instance, while the vehicle is inside the home garage. This may establish a new POI such that the controller 105, via the vehicle location sensor 125, thereon recognizes the home garage as a POI.

The controller 105 may be configured to associate the vehicle height input into the user interface 110 with POI clearance heights to generate a point of collision (POC). A POC may represent the vehicle's height greater than the POI clearance height, and include the GPS coordinates for that location, and the particular roadway and direction of travel. For example, if the controller 105 detects a user input choosing the selectable option for a high trailer size (e.g., ~13 ft/396 cm) and the vehicle is approaching the GPS coordinates for a POI with a clearance height of 12.5 ft/381 cm, the controller 105 may generate a POC and alert the driver of a potential collision. Additionally, the controller 105 may store the POC associated with the high trailer size selectable option, for example, in the geographical information database 115. The controller 105 may generate a plurality of POCs in response to the vehicle height input into the user interface 110 and the pre-existing POIs in the database.

Additionally, the controller 105 may be configured to detect in real-time potential POCs not already maintained in the database 115 while the vehicle is in-route to a destination. The first and second sensor 120, 125 may communicate to the controller 105 the vehicle is approaching a low clearance structure and determine the structure's height is below the vehicle height entered into the user interface 110. For example, the first sensor 120 may detect an overpass and determine the clearance height of the overpass. The controller 105 may compare the overpass clearance height with the height entered into the user interface 110. In the event the vehicle height is greater than the overpass clearance height, the controller 105 may generate a POC, issue an alert to the user interface 110, and record, via the second sensor 125, the location of the vehicle. The database 115 may thereby store the POC associated with the specific vehicle height for future reference.

The controller 105 may access the geographical information database 115 to filter out from consideration for POCs various POIs that the vehicle will likely not pass in response to the vehicle's current location. For example, the controller 105 may evaluate potential POIs within a predefined radius, such as 20 miles from the vehicle location. Additionally or alternatively, the controller 105 may evaluate POIs along a particular roadway or a predicted path or potential route, or a user selected route to a target destination (e.g., the user enters into the navigation system a target destination). After receiving the target destination, the controller 105 may evaluate the particular roadways and travel directions included in the user's selected route for potential POIs. Alternatively or additionally, the controller 105 may use a (massively parallel processing) MPP determination from other controller 105 components (e.g., the navigation database, GPS, etc.) while traveling along route to predict potential POIs. Once these potential or likely POIs are identified, the controller 105 may filter the POIs that are remote from the vehicle location or not on or along the MPP to the target destination. In this way, the controller 105 may reduce processing time for determining POCs by including less POIs for comparison with the vehicle height. Furthermore, the controller 105 may limit or prevent identification of POIs that are not likely to become relevant for a particular trip.

The controller 105 may be in communication with a remote server 130 via the user interface device 110. The controller 105 and remote server 130 may be in communication via a wireless network, for example a LAN, WAN, WiFi, or cloud-based communications. The remote server 130 may include a business (e.g., bank, restaurant, etc.) or a governmental entity. The remote server 130 may transmit relevant POI information, such as clearance height and GPS location, directly to the user interface 110. Additionally or alternatively, the remote server 130 may communicate the POI to a PDA or smartphone, which may then update the database 115.

The controller 105, user interface 110, geographical information database 115, and first and second sensors 120, 125 may communicate with each other via an interface (not shown). The interfaces may include an input/output system configured to transmit and receive data from the respective components. The interface may be one-directional such that data may only be transmitted in one direction, e.g., from the controller 105 to the database 115, or vice versa. Alternatively, the interface may be bi-directional, allowing both receiving and transmitting data between components.

Referring to FIG. 2, the controller 105 may receive various inputs and generate various outputs for determining the clearance of an approaching overhead structure. The controller 105 may receive input indicating the vehicle height from the user interface 110. The controller 105 may also receive GPS coordinates from the second sensor 125 and input of existing POIs, via the database 115, in proximity to the vehicle or along a particular predicted path as the vehicle drives along a route. The controller 105 may likewise receive input detecting the low clearance structure and clearance height (from the first sensor 120) located at the approaching POI. The controller 105 may then use the input received from the user interface 110, database 115, and first and second sensor 120, 125 to determine a potential POC. If the vehicle height is greater than the approaching POI clearance height, the controller 105 may determine the approaching low clearance is a POC. For example, if the controller 105 detects a user input indicating the cargo is a bicycle having a total vehicle height of 310 cm and the clearance height of the POI is 300 cm, the controller 105 may determine a POC exists. On the other hand, if the controller 105 detects a user input indicating the cargo is kayak having a total vehicle height of 190 cm (vehicle base height of 152 cm, kayak height of 40 cm), the controller may determine a POC does not exist at the same POI.

Additionally, the controller 105 may output an alert to the user interface 110 in response to detecting an approaching POC. The alert may be issued at various times and various levels. For instance, a particular level of alert may be used when a route is entered in the navigation system, and another level of alert may be issued when the MPP heuristic determines a POC while the vehicle is in route. The controller 105 may then suggest appropriate actions for the user, such as taking an alternate route or stopping immediately. The alert may be displayed on the user interface 110 display, or be broadcast over the vehicle speakers. Furthermore, the controller 105 may be configured to engage the vehicle brakes in response to detecting an imminent POC. That is, the controller 105 may engage vehicle safety features, such as the vehicle brakes, in an attempt to mitigate a collision. Additionally, the controller 105 may update the database 115 in response to detecting a new low clearance structure and/or a clearance height.

Still referring to FIG. 2, the controller 105 may receive low clearance structure input from a remote server 130 over a wireless communications network via the user interface 110. The remote server 130 may be any establishment that may have a low clearance structure. For example, the remote server 130 may be a bank, fast food drive-thru, or any business or governmental entity that may want to warn users of a low clearance structure on its premise. The remote server 130 may be configured to transmit a warning or a clearance height via a beacon or radio frequency (RF) transmissions. The remote server 130 may be in communication with the user interface 110, which in turn communicates with the controller 105. The controller 105 may then use the location and clearance height of the remote server 130 to create a POI and store the POI in the geographical information database. The controller 105 may determine the remote server 130 is an approaching POC in response to the vehicle height entered into the user interface 110. In the event the vehicle height is greater than the clearance height of the remote server 130 POI, the controller 105 may generate a POC and alert the user of an impending collision.

FIG. 3 illustrates an exemplary database table filled with POIs maintained in the geographical information database 115. The POIs may be prepopulated by the OEM or may be auto-populated by the controller 105 in response to detecting new low clearance structures. In an embodiment, the POI may be defined by a location name (e.g., home garage, McDonalds, Inc. drive-thru, highway underpass, etc.), the GPS coordinates (e.g., latitude and longitude), the clearance height, the roadway on which the POI is located (e.g., Interstate-75, Lake Shore Drive), and the direction in which the vehicle is traveling (e.g., North, South, East, West). Alternatively, the database 115 may include multiple POI tables classified by location (e.g., towns, cities, or counties), frequently visited, most recent, are any combination thereof.

As previously mentioned, the POIs are locations of low clearance structures (e.g., underpasses, bridges, tree branches, tunnels, etc.). Thus, the POI applies generally to all selectable options, regardless of the vehicle height. The POI merely signals to the controller 105 that a location of significance is approaching. On the other hand, POCs correlate to particular vehicle heights, and may be generated when the controller 105 determines the approaching POI has a clearance height less than or equal to the vehicle height (e.g., there is a potential for collision). Thus, for example, the selectable option for a high/tall trailer may have the same POIs as the selectable option for a kayak. However, the high trailer selectable option and the kayak selectable option may generate differing POCs. The high trailer selectable option may generate, via the controller 105, POCs as the vehicle nears a POI with a clearance height equal to or below that of the selectable option height (e.g., ~396 cm for a high trailer). Likewise, the kayak selectable option may generate, via the controller 105, differing POCs as the vehicle approaches POIs with a clearance height equal to or below the kayak selectable option height (e.g., vehicle base height plus ~40 cm). Therefore, the vehicle may pass under the same POI and generate a POC for one selectable option (e.g., the high trailer) but not for another selectable option (e.g., a kayak or luggage bag selectable option).

FIG. 4 illustrates an exemplary process 400 for providing an alert in response to the prepopulated POI geographical information database 115. The process 400 may begin at block 405, at which point the database 115 may include prepopulated or predefined POIs. Each POI, indicating low clearance structures associated with clearance heights, may be preloaded into the database 115 at the time of manufacture, e.g., by the OEM. Additionally, the database 115 may be subsequently updated by a series of upgrades via CDs or DVDs. Additionally or alternatively, the updates may be distributed via a wireless communication network.

At block 410, the user may enter the vehicle height via the user interface 110, thereby activating the detecting and alert system 100. That is, the controller 105 may be vigilant as to potential POIs in response to receiving the vehicle height. The user may input a standard vehicle height, a user programed vehicle height, or a customized vehicle height. For example, the user may choose the selectable option for a kayak, bicycle, cargo carrier, skies, canoe, ladder, loose luggage, low trailer, medium trailer, high trailer, or a user programed cargo setting (e.g., My Cargo 1, My Cargo 2, etc.). Alternatively, the user may enter a customized vehicle height in the event the desired height is not predefined. Additionally, the controller 105 may be configured to add a predetermined safety or precautionary height to the vehicle height to better enable a smooth passage under the low clearance structure.

At block 415, the controller 105 may determine the vehicle location via the navigation system or GPS. The controller 105 may use the vehicle's location in combination with the geographical information database 115 to determine roads, avenues, and parking lots having POIs. Upon acclimating to the vehicle position, the controller 105 may filter out from consideration POIs outside of a predefined radius, such as 20 or 25 miles. Filtering POIs located outside of the predefined radius may decrease controller 105 processing time. As the vehicle changes position, different POIs may come within the predefined radius. Additionally or alternatively, the controller 105 may generate multiple MPPs upon receiving a routing request for a particular target destination via the user interface 110. The controller 105 may determine the prepopulated POIs along each MPP and disregard the POIs falling distant or remote from the MPPs. The process may then proceed to block 420.

At block 420, the controller 105 determines whether a collision is predicted along the vehicle route. The controller 105 may associate the vehicle height and location with the POI clearance height and location to determine whether a collision is probable and/or imminent. For example, the controller 105 may generate a POC for nearby or proximate POIs having a lower clearance height than the vehicle height (e.g., the vehicle height is greater than or equal to the clearance height). Likewise, the controller 105 may generate POCs only for POIs within the predefined radius or along a MPP. If a POC is not generated, e.g., a collision is not predicted, the process 400 may return to block 415. If, on the other hand, a collision or POC is predicted, the process 400 will proceed to block 425.

At block 425, the controller 105 may output an alert in response to determining a POC is imminent or approaching. The alert may be output to the user interface 110 via the display or audio device. The alert may include a warning that a POC is approaching. Further, the controller 105 may be configured to activate safety features in the vehicle, such as applying the vehicle brakes, activating the vehicle brake lights, suggesting evasive maneuvers or alternate routes, and/or activating the dashboard LED lights.

At block 430, the controller 105 may update the geographical information database 115 with the POC for the particular selectable option (e.g., vehicle height). The controller 105 may associate a POC for the chosen selectable option with that particular POI location in the future. Thus, the controller 105 may update the database 115 of the interference (or potential interference). Additionally, the database 115 may be configured to store the issued alert, including the date, time, and location the alert was issued.

FIG. 5 illustrates an exemplary process 500 for providing an alert in response to real-time detection of a low clearance location. The process 500 may begin at block 505 in response to the controller 105 detecting the vehicle height via user input. As with block 410 of process 400, the detection and alert system 100 may activate upon receiving user input, via the user interface 110, choosing a selectable option for vehicle height.

At block 510, the controller 105 may monitor the sensors 120, 125. The controller 105 may monitor object detection sensors 120, such as an optical range finder, RADAR sensor, UWB sensor, and APS, a LIDAR sensor, among others. Additionally, the controller 105 may monitor the vehicle location via a navigation system or GPS sensors 125. The controller 105 may continually monitor the sensors 120, 125 while the detection and alert system 100 is activated.

At block 515, the object detection sensors 120 may examine the surrounding environment for any indication a low clearance structure is imminent or approaching. To be classified as a low clearance structure, the clearance height may be preprogrammed into the database 115, or may be customized by the vehicle user. For example, for a structure to be classified as a low clearance structure, the clearance height may be less than 18 feet. The sensors 120 may scan an approaching overpass, such as a tunnel, bridge, overhang, garage door, parking structure entrance, etc., to determine if the overpass is a low clearance structure. Likewise, the sensors 120 may be configured to recognize traffic sign warnings in relation to an approaching low clearance structure, e.g., a sign indicating the overpass ahead has a clearance height of 15'6". Additionally, the sensors 120 may be configured to recognize simple or natural objects, such as low tree branches, via a camera or APS 120. Upon recognizing an approaching structure, if the controller 105 determines the structure or object is not a low clearance structure, the process 500 returns to block 510. On the other hand, if the controller 105 determines, via the sensors 120, the approaching structure is a low clearance structure, the process 500 may proceed to block 520.

At block 520, the clearance height of the low clearance structure may be determined. The sensors 120 may be configured to measure the vertical distance, or height, of the opening of the approaching low clearance structure. For example, a LIDAR sensor 120 may target the opening of a low clearance tunnel and analyze the reflected light. Similarly, a RADAR or IR sensor 120 may determine the clearance height of an approaching overhang. Likewise, a vision recognition system may use known visual reference distances to compare to the clearance opening and measure the clearance height accordingly. One skilled in the art will understand that the method employed to determine the low clearance vertical height may be any method used to determine the vertical clearance distance of an approaching object. Once the controller 105, via the sensors 120, determines the clearance height of the approaching low clearance structure, the process 500 may proceed to block 525.

At block 525, the controller 105 may compare the clearance height of the approaching structure with the vehicle height entered by the user. For instance, if the controller 105 detects a user input, via the user interface 110, of a vehicle height of 15 feet (or ~4.57 meters), the controller 105 may compare that height with the clearance height detected by the sensors 120. The process 500 will then proceed to block 530.

At block 530, the controller 105 may determine if a collision is predicted with the approaching low clearance structure. If the vehicle height (including the added safety or precautionary height) is less than the clearance height, the process 500 may proceed to block 540. If, on the other hand, the vehicle height is greater than or equal to the clearance height, the controller 105 will generate a POC for the location. The process 500 may then proceed to block 535.

At block 535, the controller 105 may issue an alert via the user interface 110 of an impending collision. The controller 105 may further activate safety features, such as the vehicle brakes, brake lights, and/or interior lights, for example.

At block 540, the controller 105 may update the geographical information database with the low clearance structure. The controller 105 may determine the low clearance structure location, via the vehicle position sensor 125, and clearance height to produce a POI. Further, if the pass under was successful, e.g., a POC was not created, the controller 105 may associate the POI location and selected vehicle height as cleared for future reference. Thus, the next time the vehicle approaches the POI with the same vehicle height, the controller 105 may quickly determine that a collision may not happen. Conversely, if a POC was issued for the location and selected vehicle height, the controller 105 may be configured to update the database 115 as an interference or collision location. The controller 105 may populate database 115 with established POCs associated with a particular selectable vehicle height option for future reference. The controller 105 may further record the date, time, roadway identifier, direction of travel, and GPS location of the alert issued.

FIG. 6 illustrates an exemplary process 600 for receiving a remote communication indicating a low clearance structure and providing an alert of the same. The process 600 may begin at block 605 upon receiving a user input indicating the vehicle height. The controller 105 may activate the detection and alert system 100 in response to the user electing a selectable option indicating the vehicle height. Once the system 100 is activated, the process 600 may proceed to block 610.

At block 610, the controller 105 may receive a remote POI, including the location and clearance height, via the user interface 110. The remote POI may be transmitted by the remote server 130, which may include a business or public establishment having a low clearance structure, such as a bank drive-thru ATM or a public parking garage. The remote server 130 may broadcast on an open WiFi, Bluetooth, or other radio message, in which the vehicles telematics device (e.g., user interface 110) or smartphone may pick up the signal when in range of the remote business.

At block 615, the controller 105 may update the geographical information database 115 with the remote server POI. The database 115 may maintain the business name, clearance height, roadway, address, direction of travel, textual description, and GPS coordinates of the low clearance structure described by the message from the remote server 130. Thus, a new POI may be established.

At block 620, the controller 105 may monitor the vehicle position via the location sensors 125. The controller 105 may monitor the vehicle position in relation to the remote server 130 POI coordinates or a MPP to determine whether an interchange is likely. For instance, the controller 105 may determine whether the vehicle is merely passing the remote server 130 on the road, or has actually turned into the parking lot. Multiple sensors 120, 125 may aid in this determination. For example, the controller 105 may monitor the vehicle speed to determine whether the vehicle is likely to intersect with the remote server 130 POI. That is, if the vehicle is moving at 30 miles per hour as it approaches the remote server POI (e.g., a bank drive-thru), the controller 105 may determine the vehicle has not turned into the parking lot although the GPS coordinates indicate that it is currently passing the entrance. When the controller 105 makes the determination that the vehicle is within a close proximity or on intersecting course of the low clearance structure described by the remote server 130, the controller 105 may begin analyzing the vehicle height as compared to the remote server POI. The process 600 may then proceed to block 625.

At block 625, the controller 105 may detect whether a collision is probable in response to the vehicle height and the POI clearance height. If the vehicle height is below the clearance height, a collision is not likely to occur and the process 600 may return to block 610. The controller 105 may further update the database 115 to reflect a clear pass under the POI clearance with the particular vehicle height (e.g., associate the selectable option and POI to indicate a safe pass under). On the other hand, if the controller 105 determines the vehicle height is greater than or equal to the POI clearance height, the controller 105 may determine a collision is imminent and generate a POC.

At block 630, the controller 105 may issue an alert in response to generating a POC. The alert may indicate that a collision is probable, and the vehicle should stop or turn around. Additionally, the controller 105 may activate the vehicle safety features to mitigate any collision.

At block 635, the controller 105 may update the database 115 to reflect a collision point at the location tied to the particular vehicle height. Thus, the controller 105 may reference in the future that the location, with the vehicle height, generates a POC. Further, the controller 105 may store in the database 115 the issued alert, including the time, date, and location.

FIG. 7 illustrates an exemplary process 700 for an automated self-learning database 115 in response to detecting a low clearance structure. In other words, the self-learning process 700 may correct erroneously entered data, e.g., inaccurate clearance heights or locations initially stored in the database 115. The process may begin at block 705, in which the system 100 is activated by receiving the vehicle height.

At block 710, the controller 105 may determine the vehicle location via the vehicle position sensor 125. The controller 105 may associate the vehicle location with populated POIs in the database to determine if any potential interference points are imminent. The controller 105 may determine whether any established POIs are along an MPP or within the predefined radius of the vehicle.

At block 715, a low clearance structure may be detected. The controller 105 may detect a low clearance structure is in close proximity to the vehicle in response to the vehicle position sensors 125. Likewise, the object detection sensors 120 may indicate that an unmarked low clearance structure (e.g., one that is not established in the database 115) is approaching.

At block 720, the controller 105, via the sensors 120, may determine the clearance height of the low clearance structure. If the low clearance structure is pre-populated in the database 115, the controller 105 may compare the recorded clearance height with the detected clearance height to ensure the heights match. Conversely, if the low clearance structure is not populated in the database 115, the sensors 125 may determine the vertical height of the clearance. The controller 105 may associate the clearance height with the vehicle height to determine whether a collision is imminent. If the recorded clearance height and detected height do not match, or the detected clearance height is close to the vehicle height, the process 700 may proceed to block 725.

At block 725, the controller 105 may issue a potential collision alert in response to the imminent low clearance structure. This alert may be issued the first time the vehicle approaches the location with the selected vehicle height. The alert may be predominately cautionary, as the system 100 is unfamiliar with the particular POI location and clearance height.

At block 730, the controller 105 may monitor the pass under of the low clearance structure. That is, as the vehicle approaches the low clearance structure, the object detection sensors 120 may monitor the clearance height and determine the correct vertical clearance height. Likewise, the location sensors 125 may monitor the vehicle GPS coordinates. The controller 105 may continue to monitor the pass under until the vehicle successfully passes under the low clearance structure at block 735. For example, the controller 105 may monitor the characteristics of the low clearance structure (e.g., vertical height and location) the entire duration of the pass under. Once the pass under is successful, the process 700 may proceed to block 740.

At block 740, the controller 105 may update the geographical information database 115 with the detections received during the pass under. Thus, if the database 115 was incorrectly populated with erroneous POI data (e.g., incorrect GPS coordinates or clearance height), the information may be updated for more reliable data. Further, the database 115 may be updated to reflect a successful pass under pertaining to the POI and the selected vehicle height, thus indicating a clear passage for future reference. The controller 105 may wait for repeated detections before updating the database 115 or may in some embodiments issue a confirmation request to the user seeking affirmation that the POI data is indeed erroneous and accordingly facilitate correction.

Computing devices, such as the controller, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer-readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

What is claimed is:

1. A vehicle system comprising:
 a memory configured to maintain a database of low clearance structures and associated clearance heights;
 a controller configured to:
  generate an alert when a vehicle approaches an upcoming structure maintained in the database;
  detect, via a first sensor, an updated clearance height of the upcoming structure; and
  update the database to include the updated clearance height associated with the upcoming structure in response to the vehicle passing under the upcoming structure.

2. The system of claim 1, wherein the controller is further configured to receive a height selection from a plurality of vehicle height options, wherein the plurality of vehicle height options include various predefined vehicle heights.

3. The system of claim 2, wherein the controller is configured to evaluate other low clearance structures within a predefined radius of a vehicle location to determine if any of the other low clearance structures have a clearance height lower than the vehicle height.

4. The system of claim 3, wherein the controller is configured to output a suggested course of action in response to approaching one of the other low clearance structures having a clearance height lower than the vehicle height.

5. A method for a vehicle system comprising:
 receiving a height selection from a user interface indicating a vehicle height from a plurality of vehicle height options;
 comparing the vehicle height with a stored clearance height of an upcoming low clearance structure;
 generating an alert in response to the vehicle height being greater than the stored clearance height;
 detecting, via a first sensor, an updated clearance height of the structure; and
 updating a database to associate the updated clearance height with the structure in response to detecting the vehicle passing under the upcoming structure.

6. The method of claim 5, wherein the plurality of vehicle height options include various predefined vehicle heights.

7. The method of claim 5, further comprising evaluating other low clearance structures within a predefined radius of a vehicle location to determine if any of the other low clearance structures have a clearance height lower than the vehicle height.

8. The method of claim 7, further comprising generating a suggested course of action in response to approaching one of the other low clearance structures having a clearance height lower than the vehicle height.

9. A vehicle system comprising:
 a controller configured to:
  access a database configured to maintain a plurality of structures associated with a stored clearance height;
  receive a height selection from a user indicating a vehicle height from a plurality of vehicle height options;
  compare the vehicle height with a stored clearance height of an upcoming structure;
  generate an alert in response to the vehicle height being greater than the stored clearance height of the upcoming structure;
  detect, via a first sensor, an updated clearance height of the upcoming structure; and
  update the database with the updated clearance height of the upcoming structure in response to the vehicle passing under the upcoming structure.

10. The system of claim 9, wherein the controller is configured to:
 determine a route radius based on a current vehicle location; and
 identify at least one of the plurality of structures as being a possible point of collision in response to the structure being within the route radius and the vehicle height exceeding the stored clearance height of the upcoming structure.

11. The system of claim 10, wherein the controller is configured to generate the alert in response to identifying a point of collision within the route radius.

12. The system of claim 9, wherein the controller is configured to:
 receive route data and generate a most probable path; and
 filter remote points of interest outlying the most probable path in response to the route data.

13. The system of claim 9, wherein the plurality of vehicle height options include at least a first predefined vehicle height and a second predefined vehicle height.

* * * * *